(12) United States Patent
Braley et al.

(10) Patent No.: US 11,884,026 B2
(45) Date of Patent: Jan. 30, 2024

(54) MOLDED ARTICLE AND METHOD FOR MAKING THE SAME

(71) Applicants: Industrial Dielectrics, Inc., Noblesville, IN (US); A & P Technology, Inc., Cincinnati, OH (US)

(72) Inventors: Michael S. Braley, Cincinnati, OH (US); Kevin M. Cahill, Fishers, IN (US); James D. Jern, Lapel, IN (US)

(73) Assignees: Industrial Dielectrics, Inc., Noblesville, IN (US); A & P Technology, Inc., Cincinnati, OH (US)

( * ) Notice: Subject to any disclaimer, the term of this patent is extended or adjusted under 35 U.S.C. 154(b) by 951 days.

(21) Appl. No.: 16/774,635

(22) Filed: Jan. 28, 2020

(65) Prior Publication Data

US 2020/0238634 A1    Jul. 30, 2020

Related U.S. Application Data

(60) Provisional application No. 62/797,940, filed on Jan. 28, 2019.

(51) Int. Cl.
*B29C 70/08* (2006.01)
*B29C 70/40* (2006.01)
*B29C 70/00* (2006.01)
*B29C 70/46* (2006.01)
*B29K 307/04* (2006.01)
*B29K 101/12* (2006.01)
*B29K 101/10* (2006.01)

(52) U.S. Cl.
CPC ........ *B29C 70/081* (2013.01); *B29C 70/0035* (2021.05); *B29C 70/40* (2013.01); *B29C 70/46* (2013.01); *B29K 2101/10* (2013.01); *B29K 2101/12* (2013.01); *B29K 2307/04* (2013.01)

(58) Field of Classification Search
CPC ... B29C 70/081; B29C 70/0035; B29C 70/40; B29C 70/46; B29K 2101/12; B29K 2101/10; B29K 2307/04; B29L 2031/32; B60B 5/02; B60B 2310/80; B60B 3416/342; B60B 3416/344
USPC ............. 428/375, 299.1, 299.4, 299.7, 298.7
See application file for complete search history.

(56) References Cited

FOREIGN PATENT DOCUMENTS

DE    102016117798 A1 *  3/2018

* cited by examiner

*Primary Examiner* — Camie S Thompson
(74) *Attorney, Agent, or Firm* — Barnes & Thornburg LLP (57) ABSTRACT

A composite article includes a first segment and a second segment spaced apart form the first segment. The composite article includes continuous fibers that extend from the first segment to the second segment. The composite article also includes discontinuous fiber distributed throughout the composite article.

20 Claims, 6 Drawing Sheets

MOLDED ARTICLE AND METHOD FOR MAKING THE SAME

PRIORITY CLAIM

This application claims the benefit under 35 U.S.C. § 119(e) of U.S. Provisional Application No. 62/797,940, Jan. 28, 2019, the disclosure of which is expressly incorporated by reference herein as if fully produced herein.

BACKGROUND

The present disclosure relates to composite articles. More particularly, the present disclosure relates to composite articles made by molding.

SUMMARY

According to the present disclosure, a method of manufacturing a composite article comprises several steps. In illustrative embodiments, the method comprises contacting continuous fibers with a first resin to form coated continuous fibers, cross-linking a portion of the coated continuous fibers to form partially cross-linked continuous fibers having a cross-linked first segment and an uncross-linked second segment, contacting the partially cross-linked continuous fibers with molding compound comprising a second resin and discontinuous fibers, and molding together the partially cross-linked continuous fibers and the molding compound to form a composite article.

In illustrative embodiments, the composite article comprises a first segment comprising continuous fibers spaced apart from discontinuous fibers, and a first interface located between the continuous fibers and the discontinuous fibers, and a second segment spaced apart from the first segment, the second segment comprising continuous fibers spaced apart from discontinuous fibers, and a second interface located between the continuous fibers and the discontinuous fibers.

In illustrative embodiments, the first interface provides mechanical contact between the continuous fibers and the discontinuous fibers and the second interface provides chemical contact between the continuous fibers and the discontinuous fibers.

In illustrative embodiments, the first resin is a thermosetting resin.

In illustrative embodiments, wherein the second resin is a thermosetting resin.

In illustrative embodiments, wherein the first resin and the second resin are substantially the same.

In illustrative embodiments, wherein first step of contacting comprises compression molding.

In illustrative embodiments, wherein second step of contacting comprises compression molding.

In illustrative embodiments, a composite article comprising: a first segment comprising continuous fibers spaced apart from discontinuous fibers, and a first interface located between the continuous fibers and the discontinuous fibers, a second segment spaced apart from the first segment, the second segment comprising continuous fibers spaced apart from discontinuous fibers, and a second interface located between the continuous fibers and the discontinuous fibers.

In illustrative embodiments, the first interface provides mechanical contact between the continuous fibers and the discontinuous fibers and the second interface provides chemical contact between the continuous fibers and the discontinuous fibers.

In illustrative embodiments, the continuous fibers of the first segment are contained in a first cross-linked resin.

In illustrative embodiments, the discontinuous fibers of the first segment are contained in a second cross-linked resin.

In illustrative embodiments, no chemical cross-linking occurs at the first interface between the first cross-linked resin and the second cross-linked resin.

In illustrative embodiments, the continuous fibers of the second segment are contained in a first cross-linked resin.

In illustrative embodiments, wherein the discontinuous fibers of the second segment are contained in a second cross-linked resin.

In illustrative embodiments, wherein chemical cross-linking occurs at the second interface between the first cross-linked resin and the second cross-linked resin.

In illustrative embodiments, the composite article comprises a third segment located between the first segment and the second segment, the third segment comprising continuous fibers spaced apart from discontinuous fibers, and a third interface located between the continuous fibers and the discontinuous fibers.

In illustrative embodiments, the continuous fibers of the third segment are contained in a first cross-linked resin.

In illustrative embodiments, the discontinuous fibers of the third segment are contained in a second cross-linked resin.

In illustrative embodiments, the degree of chemical cross-linking occurs at the third interface between the first cross-linked resin and the second cross-linked resin is less than the degree of chemical cross-linking occurring at the second interface.

In illustrative embodiments, the continuous fibers are a braid, a weave, or a fabric.

In illustrative embodiments, the continuous fibers include carbon tow fiber.

In illustrative embodiments, the ratio of the length of the continuous fibers to the length of the discontinuous fibers is at least about 2:1 or at least about 10:1.

In illustrative embodiments, an article for use in compression molding comprising: a cross-linked material; a non-cross-linked material, at least a portion of the non-cross-linked material in contact with at least a portion of the cross-linked material; and the cross-linked material including, at least in part, long fiber reinforcement.

In illustrative embodiments, an article manufactured using compression molding, comprises a continuous fiber material, the continuous fiber material including, at least in part, long fiber reinforcement; and a discontinuous fiber material, at least a portion of the continuous fiber material in contact with at least a portion of the discontinuous fiber material.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figure in which:

FIGS. 3A-3D show a portion of the preform of FIG. 2, with FIG. 3A being a perspective view of the preform of FIG. 2; FIG. 3B is a cross-sectional view taken along line 3B-3B of FIG. 3A and showing a first segment of the preform having long fibers and cross-linked resin; FIG. 3C is a cross-sectional view taken along line 3C-3C of FIG. 3A and showing a third segment of the preform having a lesser degree of curing than the first segment; and FIG. 3D is a cross-sectional view taken along line 3D-3D of FIG. 3A and showing a segment of the preform without cured resin;

FIGS. 4A-4D show a portion of the composite article of FIG. 1, with FIG. 4A being a perspective view showing the preform of FIG. 4A after a step of molding; FIG. 4B is a cross-sectional view taken along line 4B-4B of FIG. 4A and showing a first segment of the composite article having long fibers, a first interface and cross-linked resin including discontinuous fibers; FIG. 4C is a cross-sectional view taken along line 4C-4C of FIG. 4A and showing a third segment of the preform showing a portion of continuous fibers chemically crosslinking with the resin of the discontinuous fibers; and FIG. 4D is a cross-sectional view taken along line 4D-4D of FIG. 4A and showing a second segment of the preform where the continuous fibers are in a resin chemically cross-linked with the resin of the discontinuous fibers;

DETAILED DESCRIPTION

Figure 1:
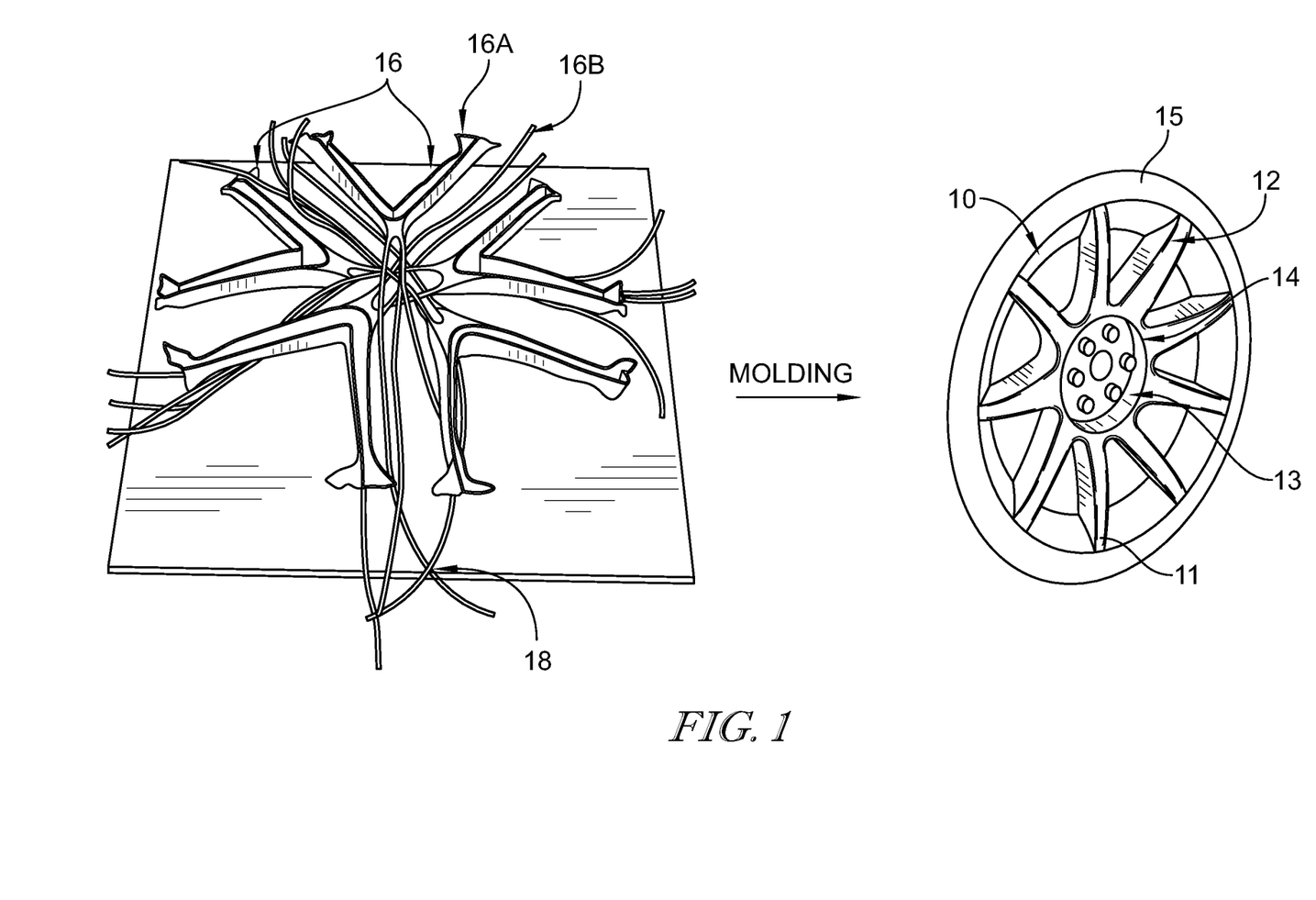
FIG. 1 is a schematic diagram showing from left to right a plurality of preforms undergoing a molding process to form a composite article.

A composite article 10 may be formed by molding a plurality of preforms 16 as suggested in FIG. 1. In illustrative embodiments, composite article 10 comprises continuous fibers 18 and discontinuous fibers 20, as suggested in FIG. 4A, that cooperate to provide strength to composite article 10. Continuous fibers 18 are partially cured in preform 16 to minimizing shifting of continuous fibers 18 during subsequent molding to form composite article 10. In illustrative embodiments, composite article 10 comprises a first segment 12 and a second segment 14 spaced apart from first segment 12, and continuous fibers 18 extend from first segment 12 to second segment 14.

In one example, the composite article 10 may be a wheel, as shown in FIG. 1. When composite article 10 is a wheel, composite article 10 comprises a plurality of spokes 11 extending from a hub 13 toward a rim 15. Spokes 11 and hub 13 may be formed by molding a plurality of preforms 16 as shown in FIG. 1. Illustratively, spokes 11 comprise continuous fibers 18 that extend from hub 13 to rim 15. In some embodiments, spokes 11 further comprise discontinuous fibers distributed throughout spokes 11.

Figure 6:
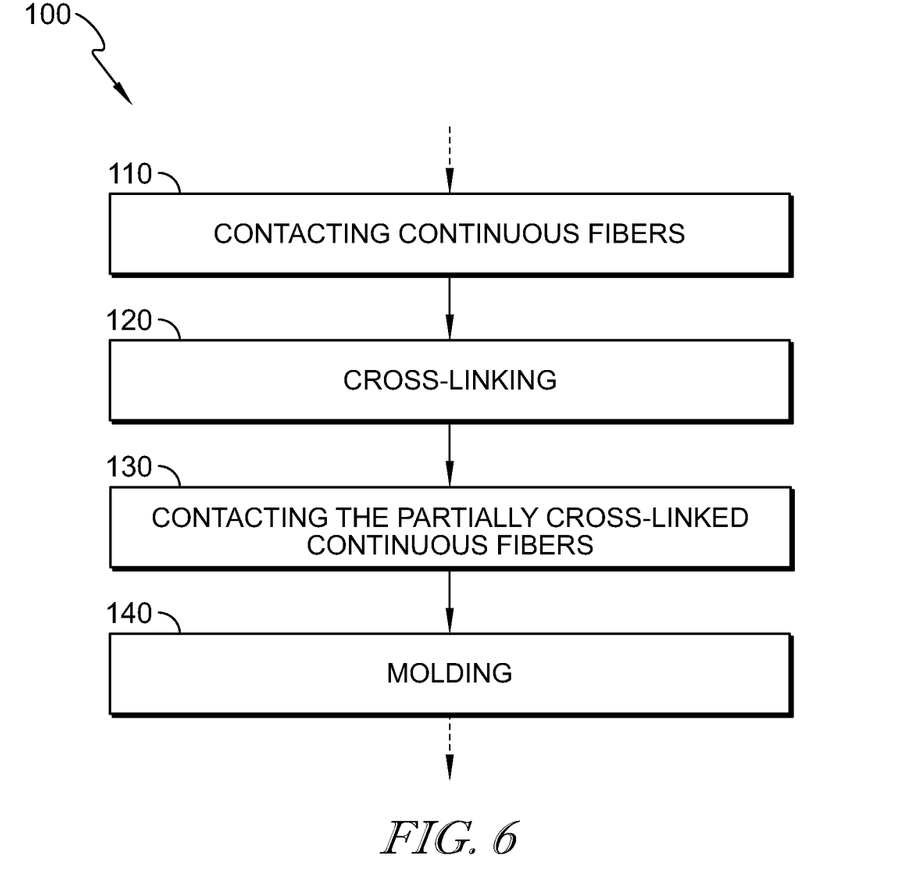
FIG. 6 is a diagrammatic representation of a process for forming the composite article.

A process 100 for forming composite article 10 is suggested in FIG. 6. In some embodiments, process 100 comprises a step of contacting 110 continuous fibers 18 with a first resin to form coated continuous fibers. In some embodiments, the process 100 comprises a step of cross-linking 120 a portion of coated continuous fibers to form partially cross-linked continuous fibers. In some embodiments, step 120 forms preform 16 that is used for subsequent molding. In some embodiments, process 100 comprises a step of contacting 130 the partially cross-linked continuous fibers with molding compound. In some embodiments, process 100 comprises a step of molding 140 together the partially cross-linked continuous fibers with the molding compound.

The step of contacting 110 comprises contacting continuous fibers 18 with a resin, sometimes called molding compound. In illustrative embodiments, the resin is a resin matrix that comprises the resin and additives. In illustrative embodiments, the resin matrix is a paste. Illustrative resin, resin matrix, or molding compound is available from IDI Composites International as, for example, Sheet Molding Compound or Bulk Molding Compound.

In illustrative embodiments, the resin matrix comprises a thermosetting polymeric resin such as unsaturated polyester, vinyl-ester, epoxy, phenolic, or similar resins or blends of such resins.

In some embodiments, the resin comprises a cross-linkable functional group. In some embodiments, the resin comprises a thermosetting polymer. Illustrative thermosetting polymers include vinyl-esters, epoxy, polyurethanes, phenolics, or a blend/hybrid of similar cross-linking polymers.

In some embodiments, the resin matrix comprises a chemical activator, an inhibitor, a thickener, a filler, or combinations thereof.

Illustrative thickeners include magnesium oxide, magnesium hydroxide, polymeric MDI (methylene diphenyl diisocyanate), and aluminum-organic chelates.

Illustrative fillers include calcium carbonate, aluminum trihydrate (ATH), and clay (kaolin).

Additional additives that may be present in the resin matrix include Glass microspheres, Pigments, UV inhibitors, and combinations thereof.

Figures 3A, 3B, 3C, 3D:
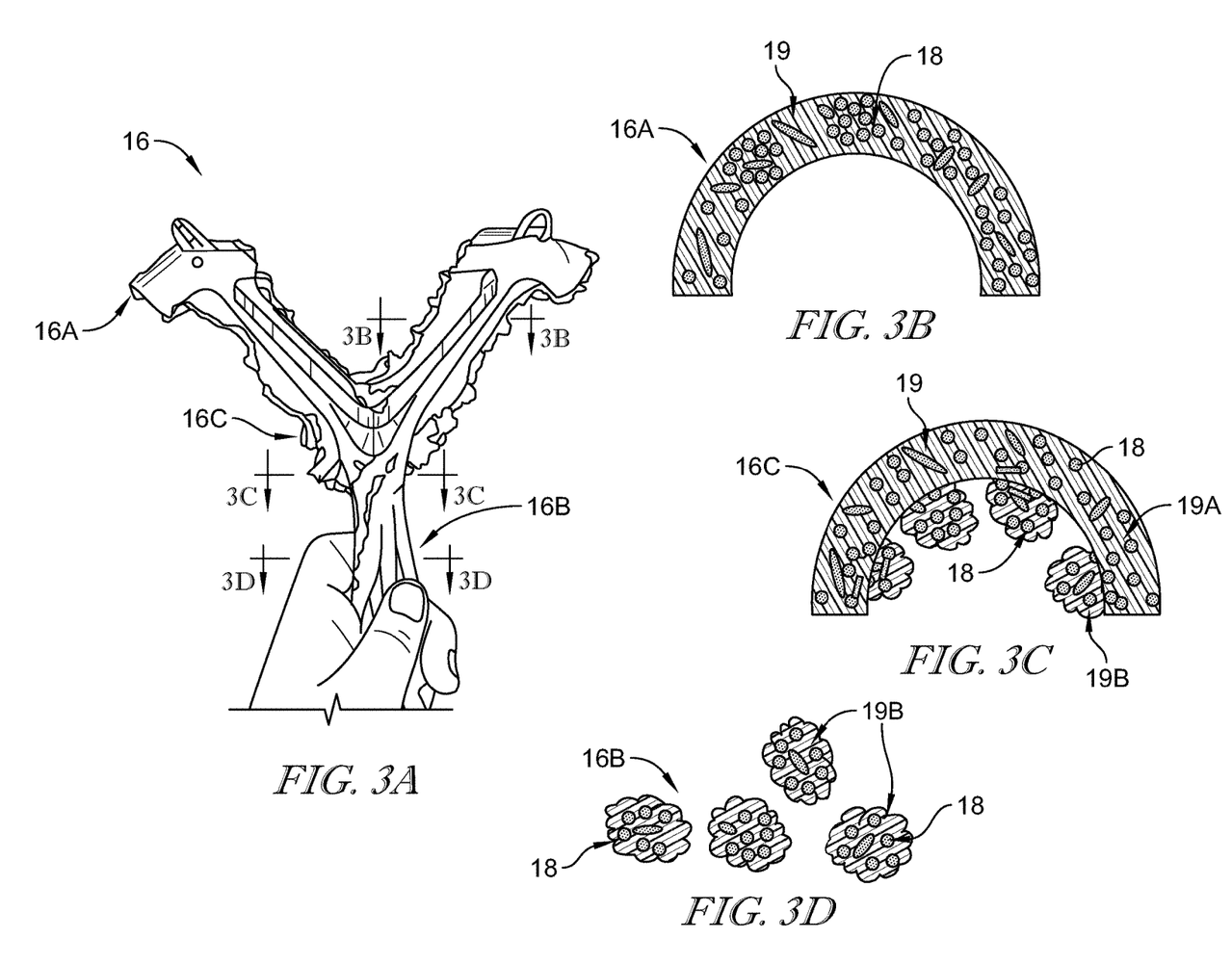
Figures 4A, 4B, 4C, 4D:
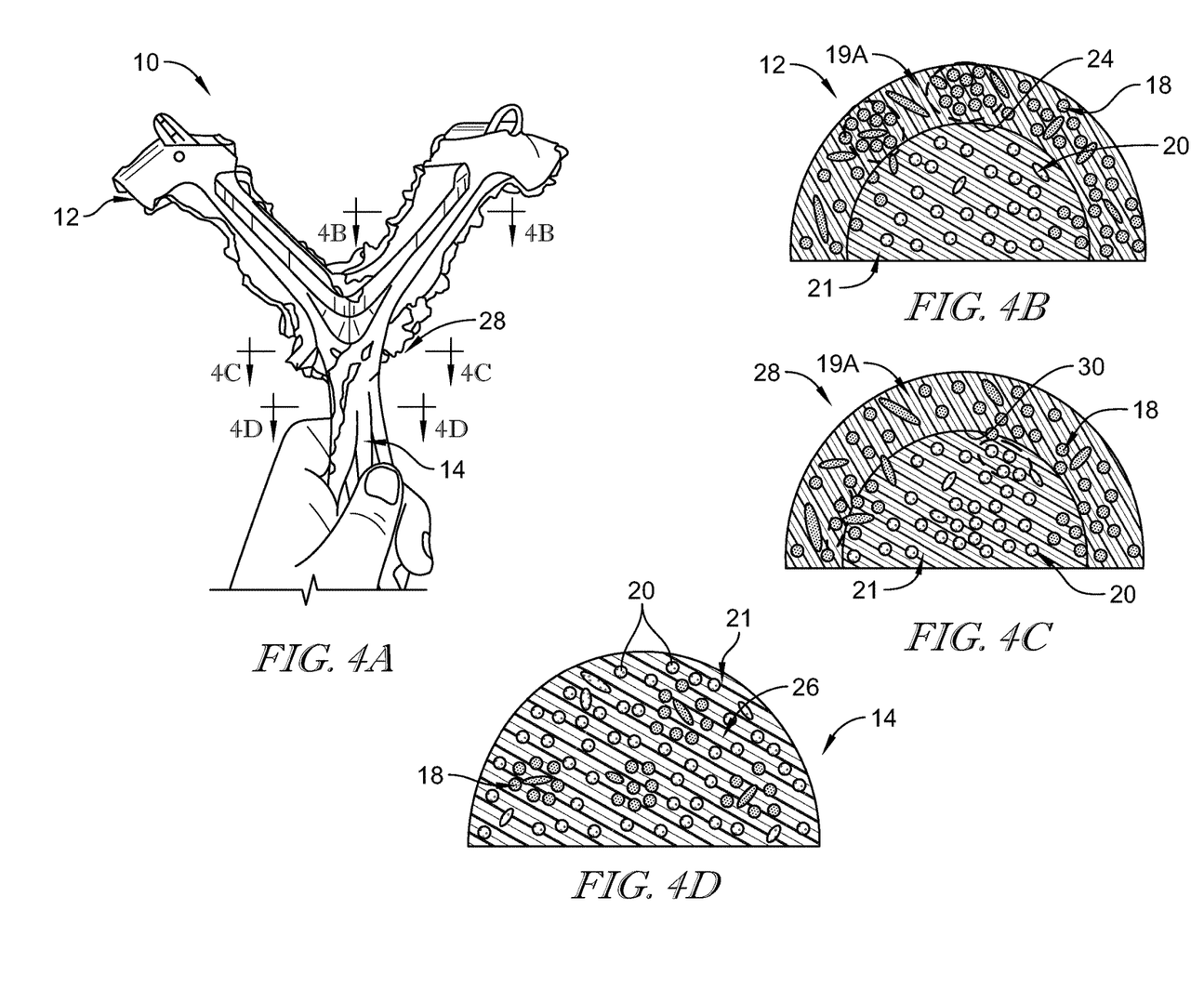

Exemplary continuous fiber 18 include braided fiber. Exemplary braided fiber may be tape or rope. Exemplary tape may be tape #1, 3.5" W, +/−45, Carbon Triaxial Tape, 26.35 FT/LB, 18.7 OZ/SQ YD, 634 GSM; or, alternatively, tape #2, 2.5" W, +/−34, Carbon Triaxial Tape, 18.90 FT/LB, 36.6 OZ/SQ YD, 1241 GSM. Exemplary braided fiber, or rope, includes rope #1, 0.2" OD, +/−21, Carbon Biaxial Cored Braid, 81.39 FT/LB. In some embodiments, continuous fiber 18 may include any of: (i) tape #1 alone, (ii) tape #2 alone (iii) tape #1 and rope #1 (iv) tape #2 and rope #1, (iv) tape #1 and tape #2 (tape #1 and #2 options may be combined depending upon the structural load of the final molded article) or (iv) rope #1 alone (rope #1 may be used alone depending upon the structural load of the final molded article). FIGS. 3A and 4A show the use of tape #1 or #2 alone or in combination with rope #1. See for example, for tape #1 or #2 and rope #1 FIGS. 3A and 3B or 4A and 4B; rope #1 alone FIG. 3C or 4C; for tape #1 or #2 alone.

Additional embodiments of continuous fiber 18 include 12 inch long braid in strips and stacked in multiple layers, 60 inch long braided uni-directional fiber with braided sleeve (also known as shoelace), 24 inch long unidirectional fiber with transverse binder polymer to hold fibers in alignment, 4 inch long isobraided fabric (QISO) to provide more uniform load carrying capacity, and 36 inch long bundles of fiber roving with transverse stitching to group fibers like a fabric.

In some embodiments continuous fiber 18 is a continuous braided fiber. Illustratively, step 110 can be performed by dipping continuous fiber 18 into a resin paste. Illustratively, the dipped continuous fiber may be referred to in the art as a pre-preg 22. In some embodiments, only a portion of continuous fiber 18 is contacted with the resin paste. In some embodiments, the dipped continuous fiber is partially dried to achieve a pre-determined viscosity.

Cross-linking step 120 comprises molding pre-preg 22. In some embodiments step 120 may be performed by compression molding. In some embodiments, step 120 is performed by heating pre-preg 22 to a particular temperature to cross-link the resin. In some embodiments, step 120 is performed at a temperature at least 120° C. or about 140° C. to about 160° C. In some embodiments, only a portion of pre-preg 22 is heated. Illustratively, step 120 produces preform 16.

Figure 2:
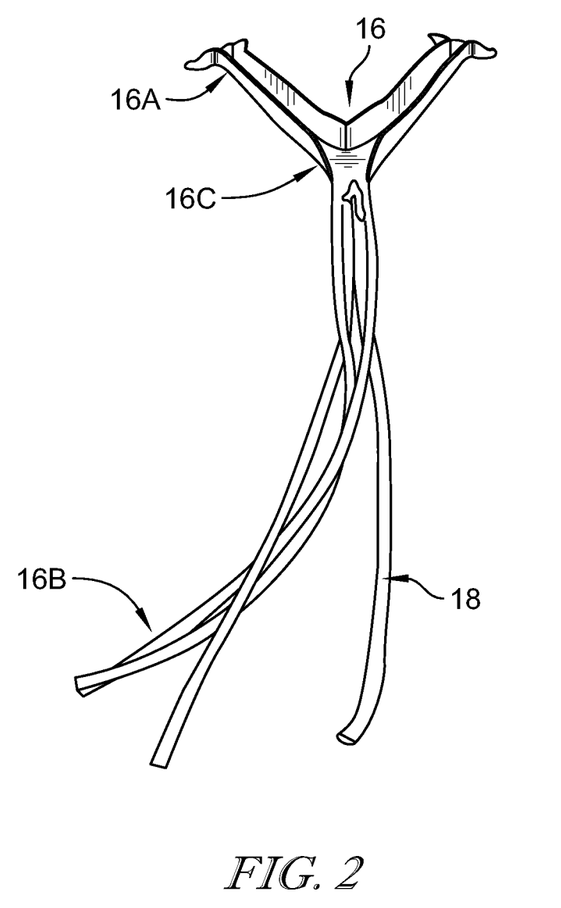
FIG. 2 is a perspective view of a preform from FIG. 1, showing the preform includes a partially molded segment and an unmolded segment.

Preform 16 has a first segment 16A and a second segment 16B, as shown in FIG. 2. First segment 16A has been cross-linked during cross-linking step 120 so that first segment 16A comprises continuous fibers 18 and cross-linked resin 19A. In some embodiments, second segment 16B remains uncross-linked so that second segment 16B comprises continuous fibers 18 and uncross-linked resin 19B. In some embodiments, first segment 16A comprises cross-linked resin that is unable to be further cross-linked in later steps of process. In some embodiments, preform 16 comprises a third segment 16C that comprises cross-linked resin 19A, uncross-linked resin 19B, and continuous fibers 28.

Figure 5:
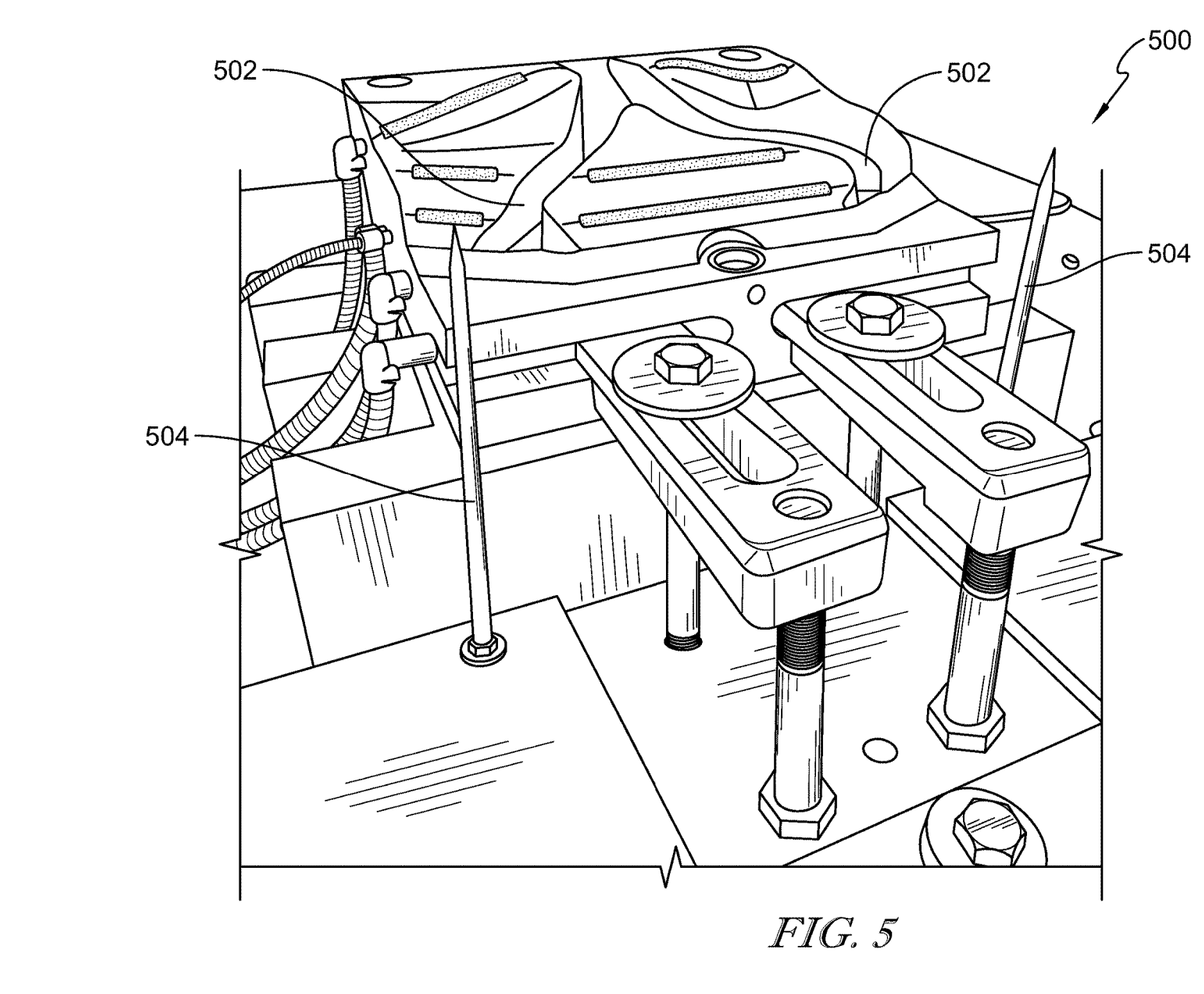
FIG. 5 is a perspective view of an illustrative molding cavity used to mold the preform to form the composite article.

FIG. 5 shows a molding cavity 500 that may be used for the manufacture of composite article 10 or preform 16. The mold cavity includes a recess 502 within which fiber reinforcement may be positioned to provide the "v" shaped material, sometimes called first segment 16A of preform 16, as shown in FIG. 3A and 4A. Pins 504 also are shown. The pins in some examples may serve to support the application of material to the mold 500 by, for example, applying a rope continuous fiber reinforcement around the pin and to provide at least two strands of the rope along the length of the cavity 502 and each of the "v" shaped materials.

In some embodiments, the matrix or the molding compound used in steps 110, 120 is substantially free of discontinuous fiber. In such embodiments, the resin cross-links a portion of continuous fibers. In such embodiments, this portion of continuous fiber cross-linked in step 120 would be unavailable for further cross-linking in subsequent steps.

In some embodiments, process 100 comprises step of contacting 130 the partially cross-linked continuous fibers with molding compound. In illustrative embodiments, step 130 is performed on preform 16. In some embodiments, step 130 is performed in a mold, such as a mold used in compression molding. In some embodiments, the entirety of the preform 16 is contacted with the molding compound. In some embodiments wherein preform 16 is only partially cross-linked in step 120, the resin from step 110 is uncured and directly contacts the uncured molding compound. In some embodiments, the resin from step 110 and the resin for step 130 are chemically compatible. In some embodiments, the resin from step 110 and the resin for step 130 are substantially the same.

In illustrative embodiments, molding compound comprises a resin, sometimes called a resin matrix, and discontinuous fiber. In illustrative embodiments, the resin matrix comprises a thermosetting polymeric resin such as unsaturated polyester, vinyl-ester, epoxy, phenolic, or similar resins or blends of such resins. Illustrative molding compound is available from IDI Composites International as, for example, Sheet Molding Compound or Bulk Molding Compound. Exemplary molding compound include FORTIUM™ and ULTRIUM™ and in particular ULTRIUM™ 4660 EMC from IDI Composites. In some embodiments, the molding compound comprises about 60% discontinuous fiber. In some embodiments, the discontinuous fibers is a carbon fiber.

In some embodiments, the resin comprises a cross-linkable functional group. In some embodiments, the resin comprises a thermosetting polymer. Illustrative thermosetting polymers include vinyl-esters, epoxy, polyurethanes, phenolics, or a blend/hybrid of similar cross-linking polymers. In some embodiments, the resin is an epoxy.

In some embodiments, the resin matrix comprises a chemical activator, an inhibitor, a thickener, a filler, or combinations thereof.

Illustrative thickeners include magnesium oxide, magnesium hydroxide, polymeric MDI (methylene diphenyl diisocyanate), and aluminum-organic chelates.

Illustrative fillers include calcium carbonate, aluminum trihydrate (ATH), and clay (kaolin).

Additional additives that may be present in the resin matrix include glass microspheres, pigments, UV inhibitors, and combinations thereof.

In some embodiments, the molding compound comprises a discontinuous fiber 20. Illustratively, discontinuous fiber 20 can be created by chopping continuous fiber strands into short length (typical ½ in to 2 in). In some embodiments, the resin matrix comprises about 15% to about 65% discontinuous fiber.

Examples of discontinuous fiber 20 include chopped fiber created by running multi-end roving glass strand through a SMC chopper to drop ½ inch and 1 inch blend of discontinuous glass into the resin matrix, chopped fiber created by running 3 k to 50 k carbon fiber bundles through a SMC chopper to drop 1 inch carbon fiber into the resin matrix, and chopped fiber created by running roving of basalt fiber through a SMC chopper to drop 2 in basalt fiber into the resin paste.

In some embodiments, process 100 comprises step 140 of molding together the preform 16 and the molding compound. In illustrative embodiments, molding step 140 cures the resin of the molding compound from step 130 and any uncured resin from step 110.

Illustratively, first segment 12 is formed from the portions of preform 16 that were cross-linked in step 120 and subsequently cured in molding step 140. In some embodiments, curing the resin from the molding compound forms first interface 24 in first segment 12. In some embodiments, only mechanical contacts occur at first interface 24 between the cross-linked resin 19A and the cured resin 21 from the molding compound from step 130. In some embodiments, continuous fibers 18 are spaced-apart form discontinuous fibers 20.

Illustratively, second segment 14 is formed from the portions of preform 16 that were not cross-linked in step 120 but was subsequently cured in molding step 140. In some embodiments, curing the resin from the molding compound forms a second interface 26 in second segment 14. In some embodiments, because the resin is still the un-cured from step 110, chemical bonding occurs between the resin from step 110 and the molding compound from step 130 to form cross-linked resin 21. In some embodiments, although continuous fibers 18 are spaced-apart form discontinuous fibers 20, chemical bonding occurs between the resin from step 110 and the molding compound from step 130.

Molding step 140 comprises molding preform 16. In some embodiments step 140 may be performed by compression molding. In some embodiments, step 140 is performed by heating preform 16 to a particular temperature to cross-link the resin. In some embodiments, step 140 is performed at a temperature at least 120° C. or about 140° C. to about 160° C. In some embodiments, only a portion of pre-preg 22 is heated. In some illustrative embodiments, molding step 140 produces composite 16.

In illustrative embodiments, composite article 10 from molding step 140 may undergo further process to form articles, such as a wheel as suggested in FIG. 1. In some embodiments, composite article 10 comprises first segment 12 and second segment 14 spaced apart from first segment 12

In some embodiments, first segment 12 comprises continuous fibers 18 discontinuous fibers 20, and first interface 24. In some embodiments, continuous fibers 18 are spaced apart from discontinuous fibers 20. In some embodiments, first interface 24 is located between the continuous fibers 18 and the discontinuous fibers 20. In some embodiments, first interface 24 provides mechanical contact between continuous fibers 18 and the discontinuous fibers 20.

In some embodiments, second segment 14 comprises continuous fibers 18, discontinuous fibers 20, and second interface 26. Illustratively, continuous fibers 18 are spaced apart from discontinuous fibers 20. In some embodiments, second interface 26 is located between continuous fibers 18 and the discontinuous fibers 20. In some embodiments, second interface 26 provides chemical contact between continuous fibers 18 and the discontinuous fibers 20.

In some embodiments, continuous fibers 18 of first segment 12 are contained in a cross-linked resin, sometimes called a first cross-linked resin. In some embodiments, discontinuous fibers 20 of first segment 12 are contained in a cross-linked resin, sometimes called a second cross-linked resin. In some embodiments, the first cross-linked resin and the second cross-linked resin are substantially the same. In some embodiments, no chemical cross-linking occurs at first interface 24 between the first cross-linked resin and the second cross-linked resin.

In some embodiments, continuous fibers 18 of second segment 14 are contained in a cross-linked resin, sometimes called a first cross-linked resin. In some embodiments, discontinuous fibers 20 of second segment 14 are contained in a cross-linked resin, sometimes called a second cross-linked resin. In some embodiments, the first cross-linked resin and the second cross-linked resin are substantially the same. In some embodiments, chemical cross-linking occurs at second interface 26 between the first cross-linked resin and the second cross-linked resin.

In some embodiments, composite article 10 comprises a third segment 28. In some embodiments, third segment 28 extends between and interconnects first segment 12 and second segment 14.

In some embodiments, third segment 28 comprises continuous fibers 18, discontinuous fibers 20, and a third interface 30. Illustratively, continuous fibers 18 are spaced apart from discontinuous fibers 20. In some embodiments, third interface 30 is located between continuous fibers 18 and the discontinuous fibers 20.

In some embodiments, continuous fibers 18 of third segment 28 are contained in a cross-linked resin, sometimes called a first cross-linked resin. In some embodiments, discontinuous fibers 20 of third segment 28 are contained in a cross-linked resin, sometimes called a second cross-linked resin. In some embodiments, the first cross-linked resin and the second cross-linked resin are substantially the same. In some embodiments, some chemical cross-linking occurs at third interface 30. In some embodiments, the degree of chemical cross-linking that occurs at third interface 30 between the first cross-linked resin and the second cross-linked resin is less than the degree of chemical cross-linking occurring at second interface 26.

In some embodiments, the ratio of the length of the continuous fibers to the length of the discontinuous fibers is about 20:1, about 10:1, about 5:1, about 3:1, about 2 to 1, about 1.5 to 1, about 1.25 to 1, or about 1.1 to 1. In some embodiments, the ration of the length of the continuous fibers to the length of the discontinuous fibers is at least about 2:1, at least about 3:1, or at least about 10:1.

The following embodiments and representative procedures illustrate features in accordance with the present disclosure, and are provided solely by way of illustration. They are not intended to limit the scope of the appended claims or their equivalents.

Clause 1. An article for use in compression molding comprising:
  a cross-linked material;
  a non-cross-linked material, at least a portion of the non-cross-linked material in contact with at least a portion of the cross-linked material; and
  the cross-linked material including, at least in part, long fiber reinforcement.

Clause 2. The article of clause 1, further including:
  the non-cross-linked material including, at least in part, long fiber reinforcement; and
  the contact between the portion of the cross-linked material and the portion of the non-cross-linked material including, at least in part, long fiber reinforcement.

Clause 3. The article of clause 2, further including:
  the long fiber reinforcement of the contact between the portion of the cross-linked material and the portion of the non-cross-linked material crossing, at least in part, between the first cross-linked material and the non-cross-linked material.

Clause 4. The article of clause 1, the cross-linked material being formed at least in part by one of braid, weave or fabric.

Clause 5. The article of clause 1, the non-cross-linked material being formed at least in part by one of braid, weave or fabric.

Clause 6. The article of clause 1, the cross-linked material further including at least one of short fiber reinforcement or chopped fiber reinforcement.

Clause 7. The article of clause 1, the cross-linked material further including at least one of short fiber reinforcement, chopped fiber reinforcement or a combination of short fiber reinforcement and chopped fiber reinforcement.

Clause 8. The article of clause 1, the cross-linked material further comprising substantially long fiber reinforcement.

Clause 9. The article of clause 1, the non-cross-linked material further including at least one of short fiber reinforcement or chopped fiber reinforcement.

Clause 10. The article of clause 1, the non-cross-linked material further including at least one of short fiber reinforcement, chopped fiber reinforcement or a combination of short fiber reinforcement and chopped fiber reinforcement.

Clause 11. The article of clause 1, the non-cross-linked material further comprising substantially long fiber reinforcement.

Clause 12. The article of clause 1, the long fiber reinforcement includes carbon tow fiber.

Clause 13. The article of clause 10, the short fiber reinforcement is at least one of ½ inch, 1 inch, 1½ inch or 2 inches.

Clause 14. The article of clause 1, the ratio of the length of the long fiber reinforcement to the short fiber reinforcement is approximately 2 to 1, 1.5 to 1, 1.25 to 1, or 1.1 to 1.

Clause 15. The article of clause 12, the long fiber reinforcement is at least one of longer than the short fiber reinforcement in the article, 2¼, 2½ inch, 3 inch, within a range of 3 to 4 inches, or greater than 4 inches.

Clause 16. An article manufactured using compression molding, comprising:

a continuous fiber material, the continuous fiber material including, at least in part, long fiber reinforcement; and a discontinuous fiber material, at least a portion of the continuous fiber material in contact with at least a portion of the discontinuous fiber material.

Clause 17. The article of clause 16, further comprising:

at least a portion of the continuous fiber material being in mechanical contact with at least a portion of the discontinuous fiber material.

Clause 18. The article of clause 16, further comprising:

the continuous fiber material including a first continuous fiber material and a second continuous fiber material, at least a portion of the first continuous fiber material being in mechanical contact with at least a portion of the discontinuous fiber material and at least a portion of the second continuous fiber material being in chemical contact with at least a portion of the discontinuous fiber material.

Clause 19. A method comprising:

positioning a cross-linked material in at least a region of a molding cavity and the cross-linked material including, at least in part, long fiber reinforcement; and molding the material with a discontinuous fiber material using compression molding.

Clause 20. The method as recited in clause 19, the cross-linked material is at least one of: fully cross-linked, substantially cross-linked or partially cross-linked.

Clause 21. A method comprising:

positioning a material in at least a region of a molding cavity, at least a first portion of the material being, at least in part, cross-linked, at least a second portion of the material being, at least in part, non-cross-linked and the first portion including, at least in part, long fiber reinforcement; and molding the material with a discontinuous fiber material using compression molding.

Clause 22. A structurally loaded article for use in compression molding, the article positioned in a molding cavity including a first region and a second region, comprising:

a cross-linked material configured to be located at least partially in approximately the first region of the molding cavity, the cross-linked material including, at least in part, long fiber reinforcement;

a non-cross-linked material configured to be located at least partially in approximately both of the first region of the molding cavity and the second region of a molding cavity, at least a first portion of the non-cross-linked material being in contact with cross-linked material and at least a second portion the non-cross-linked material being separate from the cross-linked material; and the cross-linked material and the non-cross-linked material configured to be compression molded.

Clause 23. The structurally loaded article of clause 22, the molding cavity defining a form configured to carry a load, further comprising:

the cross-linked material configured to be positioned in the first region in order to carry the load along a stress orientation of the form.

Clause 24. A structurally loaded article produced by a method comprising:

positioning a material in at least a region of a molding cavity, at least a portion of the material being cross-linked, and the portion of the material including, at least in part, long fiber reinforcement; and molding the material with a discontinuous fiber material using compression.

Clause 25. A structurally loaded article produced by a method comprising:

positioning a material in at least a region of a molding cavity, at least a first portion of the material being, at least in part, cross-linked, at least a second portion of the material being, at least in part, non-cross-linked and the first portion including, at least in part, long fiber reinforcement; and molding the material with a discontinuous fiber material using compression molding.

Clause 26. An article configured to be compression molded, comprising:

a cross-linked material; and the cross-linked material including, at least in part, long fiber reinforcement; and the cross-linked material configured to be co-molded.

Clause 27. The article of clause 26, further comprising:

a non-cross-linked material and at least a portion of the non-cross-linked material in contact with at least a portion of the cross-linked material.

Clause 28. A plurality of materials, comprising:

a cross-linked material, the cross-linked material including, at least in part, long fiber reinforcement; and a non-cross-linked material, the non-cross-linked material including, at least in part, at least one of short fiber reinforcement or chopped fiber reinforcement.

In some embodiments, composite parts (e.g., composite article 10) may benefit from placement of continuous fibers (e.g., continuous fiber 18) in areas of high mechanical loading. The use of discontinuous fiber material (e.g., discontinuous fiber 20) can provide design and cost advantages over continuous fiber only composite material. Combining continuous fibers (e.g., continuous fiber 18) and discontinuous fiber (e.g., discontinuous fiber 20) in a composite part (e.g., composite article 10) and optimize the performance and cost of the design, but creates a challenge in proper positioning of the continuous fiber (e.g., continuous fiber 18) during manufacturing (e.g., process 100). Curing a portion of a continuous fiber region of a part (e.g., first segment 16A) and allowing an adjacent uncured region(e.g., second segment 16B) to fully chemically cross-link with a discontinuous material (e.g., discontinuous fiber 20) in the final compression molding process (e.g., molding step 140) controls fiber alignment of the continuous fiber (e.g., continuous fiber 18) and optimizes the part (e.g., composite article 10) performance.

The invention claimed is:

1. A method comprising contacting continuous fibers with a first resin that is substantially free of discontinuous fibers to form coated continuous fibers, cross-linking a portion of the coated continuous fibers to form partially cross-linked continuous having a cross-linked first segment and an uncross-linked second segment, contacting the partially cross-linked continuous fibers with molding compound comprising a second resin and discontinuous fibers, and molding together the partially cross-linked continuous fibers and the molding compound top form a composite article.

2. The method of claim 1, wherein the first resin is a thermosetting resin.

3. The method of claim 1, wherein the second resin is a thermosetting resin.

4. The method of claim 3, wherein the first resin and the second resin are substantially the same.

5. The method of claim 4, wherein first step of contacting comprises compression molding.

6. The method of claim 5, wherein second step of contacting comprises compression molding.

7. The method of claim 1, wherein the composite article comprises:

a first segment comprising continuous fibers spaced apart from discontinuous fibers, and a first interface located between the continuous fibers and the discontinuous fibers, and a second segment spaced apart from the first segment, the second segment comprising continuous fibers spaced apart from discontinuous fibers, and a second interface located between the continuous fibers and the discontinuous fibers, wherein the first interface provides mechanical contact between the continuous fibers and the discontinuous fibers and the second interface provides chemical contact between the continuous fibers and the discontinuous fibers.

8. A method comprising:

contacting continuous fibers with a first resin to form coated continuous fibers, cross-linking a portion of the coated continuous fibers to form partially cross-linked continuous fibers having a cross-linked first segment and an uncross-linked second segment, contacting the partially cross-linked continuous fibers with molding compound comprising a second resin and discontinuous fibers, molding together the partially cross-linked continuous fibers and molding compound so that the cross-linked first segment includes continuous fibers spaced apart from discontinuous fibers and the uncross-linked second segment includes continuous fibers spaced apart from discontinuous fibers, forming a first interface in the cross-linked first segment between the continuous fibers and the discontinuous fibers, and forming a second interface in the uncross-linked second segment between the continuous fibers and the discontinuous fibers, wherein the first interface of the cross-linked first segment provides mechanical contact between the continuous fibers and the discontinuous fibers and the second interface of the uncross-linked second segment provides chemical contact between the continuous fibers and the discontinuous fibers.

9. The method of claim 8, wherein the first resin is a thermosetting resin.

10. The method of claim 9, wherein the second resin is a thermosetting resin.

11. The method of claim 8, wherein the first resin and the second resin are substantially the same.

12. The method of claim 8, wherein the step of contacting continuous fibers with a first resin comprises compression molding.

13. The method of claim 12, wherein the step of contacting the partially cross-linked continuous fibers with molding compound comprises compression molding.

14. The method of claim 8, wherein the coated continuous fibers are substantially free of discontinuous fibers.

15. The method of claim 8, wherein no chemical cross-linking occurs at the first interface of the cross-linked first segment between the continuous fibers and the discontinuous fibers.

16. The method of claim 8, wherein the continuous fibers are a braid, a weave, or a fabric.

17. The method of claim 8, wherein the continuous fibers include carbon tow fiber.

18. The method of claim 8, wherein the ratio of a length of the continuous fibers to a length of the discontinuous fibers is at least 2:1 or at least 10:1.

19. The method of claim 8, wherein the ratio of a length of the continuous fibers to a length of the discontinuous fibers is at least 3:1.

20. The method of claim 8, wherein the second resin comprises a chemical activator, an inhibitor, a thickener, a filler, or combinations thereof.

* * * * *